US012650363B2

(12) United States Patent
Sundberg

(10) Patent No.: US 12,650,363 B2
(45) Date of Patent: Jun. 9, 2026

(54) CONTROL UNIT AND METHOD FOR BELT SLIP DETECTION IN CONSTRUCTION EQUIPMENT

(71) Applicant: HUSQVARNA AB, Huskvarna (SE)

(72) Inventor: Niklas Sundberg, Alingsas (SE)

(73) Assignee: HUSQVARNA AB, Huskvarna (SE)

( * ) Notice: Subject to any disclaimer, the term of this patent is extended or adjusted under 35 U.S.C. 154(b) by 79 days.

(21) Appl. No.: 18/854,718

(22) PCT Filed: Mar. 23, 2023

(86) PCT No.: PCT/SE2023/050260
§ 371 (c)(1),
(2) Date: Oct. 7, 2024

(87) PCT Pub. No.: WO2023/195888
PCT Pub. Date: Oct. 12, 2023

(65) Prior Publication Data
US 2025/0251305 A1     Aug. 7, 2025

(30) Foreign Application Priority Data
Apr. 7, 2022     (SE) ..................................... 2250443-5

(51) Int. Cl.
*G01M 13/023*          (2019.01)
*B25F 5/00*             (2006.01)
(Continued)

(52) U.S. Cl.
CPC .............. *G01M 13/023* (2013.01); *B25F 5/00* (2013.01); *B25J 9/1633* (2013.01); *F16H 7/02* (2013.01)

(58) Field of Classification Search
CPC ..... G01M 13/023; G01M 13/025; B25F 5/00; H02P 29/024; F16H 7/02
See application file for complete search history.

(56) References Cited

U.S. PATENT DOCUMENTS 3,603,121 A * 9/1971 Burkland .................. F16H 7/14
68/23.4
5,011,458 A * 4/1991 Kumm ................ F16H 37/0846
477/41
(Continued)

FOREIGN PATENT DOCUMENTS

CN          102633097 A        8/2012
CN          101922548 B    *   1/2014    .......... B60W 30/186
(Continued)

OTHER PUBLICATIONS

International Search Report and Written Opinion for International Application No. PCT/SE2023/050260 mailed May 15, 2023.
(Continued)

*Primary Examiner* — Pedro J Cuevas
(74) *Attorney, Agent, or Firm* — Burr & Forman

(57) ABSTRACT

A control unit (101, 801, 1000) for construction equipment (100, 800), configured to detect belt slip in a drive arrangement (200, 830), the drive arrangement (200, 830) comprising pulleys (210, 220, 840, 850) and at least one drive belt (230, 860) arranged to connect a motor axle (125, 870) to one or more tool axles (135, 880) of the construction equipment (100, 800), the control unit (101, 801, 1000) comprising processing circuitry (1010) configured to obtain an expected amount of effort required to accelerate the motor axle (125) from a first velocity ($\omega_0$) to a second velocity ($\omega_1$), measure an actual amount of effort required to accelerate the motor axle (125) from the first velocity ($\omega_0$) to the second velocity ($\omega_1$), and detect belt slip in the drive arrangement (200) in case the expected amount of effort exceeds the measured actual amount of effort by a margin.

22 Claims, 4 Drawing Sheets

(51) Int. Cl.
  *B25J 9/16* (2006.01)
  *F16H 7/02* (2006.01)

(56) References Cited

U.S. PATENT DOCUMENTS

| | | | |
|---|---|---|---|
| 5,374,885 A | 12/1994 | Kueppers et al. | |
| 5,572,916 A | 11/1996 | Takano | |
| 2007/0200522 A1 | 8/2007 | Kees et al. | |
| 2008/0096713 A1 * | 4/2008 | Beson | F16H 3/721 |
| | | | 475/16 |
| 2008/0199269 A1 | 8/2008 | Adamczak et al. | |
| 2010/0131232 A1 | 5/2010 | Taylor | |
| 2011/0316525 A1 | 12/2011 | Lynn | |
| 2016/0007526 A1 | 1/2016 | Greulich et al. | |
| 2016/0228960 A1 | 8/2016 | Kremsler et al. | |
| 2016/0288226 A1 | 10/2016 | Heinz et al. | |
| 2017/0024939 A1 | 1/2017 | Wonderlich | |
| 2017/0304914 A1 | 10/2017 | Sandwall | |
| 2017/0306836 A1 * | 10/2017 | Replete | F16H 7/12 |
| 2018/0193972 A1 | 7/2018 | Schadow et al. | |
| 2018/0369939 A1 | 12/2018 | Zimmerman et al. | |
| 2019/0184966 A1 * | 6/2019 | Crisp | B60W 30/18127 |
| 2019/0267927 A1 | 8/2019 | Sekiguchi et al. | |
| 2019/0323593 A1 | 10/2019 | Eck et al. | |
| 2021/0205904 A1 | 7/2021 | Schmitz et al. | |
| 2021/0321568 A1 | 10/2021 | Garton et al. | |
| 2021/0348974 A1 | 11/2021 | Sekiguchi et al. | |
| 2022/0297664 A1 * | 9/2022 | Crisp | B60L 7/10 |
| 2024/0175780 A1 * | 5/2024 | Schwefe | G01M 13/023 |

FOREIGN PATENT DOCUMENTS

| | | | | |
|---|---|---|---|---|
| CN | 105642791 A | | 6/2016 | |
| CN | 106429302 A | | 2/2017 | |
| CN | 110001619 A | * | 7/2019 | B60W 20/00 |
| CN | 108134374 B | | 7/2020 | |
| CN | 112431102 A | | 3/2021 | |
| DE | 102018131908 A1 | * | 6/2019 | F02B 67/06 |
| DE | 102018131919 A1 | * | 6/2019 | B60K 6/26 |
| DE | 212019000237 U1 | | 11/2020 | |
| DE | 112023001833 T5 | * | 3/2025 | F16H 7/02 |
| EP | 1043499 A1 | | 10/2000 | |
| EP | 1839826 A1 | | 10/2007 | |
| EP | 2189795 A1 | * | 5/2010 | F02B 77/081 |
| EP | 4314756 B1 | * | 5/2025 | G01P 3/64 |
| FR | 3026805 A1 | * | 4/2016 | F16H 57/01 |
| GB | 2243730 A | | 11/1991 | |
| GB | 2569373 A | * | 6/2019 | B60W 10/30 |
| GB | 2569375 A | * | 6/2019 | B60K 6/36 |
| JP | H07195302 A | | 8/1995 | |
| JP | H11326146 A | | 11/1999 | |
| JP | 3079937 B2 | | 8/2000 | |
| JP | 2010159128 A | | 7/2010 | |
| JP | 2010180995 A | * | 8/2010 | F16H 61/02 |
| JP | 4697219 B2 | * | 6/2011 | F16H 61/02 |
| JP | 2013220882 A | | 10/2013 | |
| JP | 2014116994 A | | 6/2014 | |
| JP | 6770317 B2 | * | 10/2020 | F16H 61/12 |
| JP | 2021012096 A | | 2/2021 | |
| WO | WO-2013153630 A1 | * | 10/2013 | B60K 6/485 |
| WO | 2020/171766 A1 | | 8/2020 | |
| WO | 2021/104723 A1 | | 6/2021 | |
| WO | WO-2022199760 A1 | * | 9/2022 | G01M 13/023 |
| WO | WO-2023195888 A1 | * | 10/2023 | F16H 7/02 |
| WO | WO-2025133075 A1 | * | 6/2025 | G01M 13/023 |

OTHER PUBLICATIONS

Search Report and Office Action for Swedish Application No. 2250443-5 mailed Nov. 1, 2022.

Mascenik et al., "Experimental Determination of the Belt Transmission Slip", Management Systems in Production Engineering, vol. 27, Issue 4, Dec. 2019, pp. 205-210.

Picot et al., "Statistic-Based Method to Monitor Belt Transmission Looseness Through Motor Phase Currents", IEEE Transactions on Industrial Informatics, Institute of Electrical and Electronics Engineers, vol. 13, Issue 3, Jun. 2017, 11 pages.

Balta et al., "Speed losses in V-ribbed belt drives", Mechanism and Machine Theory, vol. 86, Apr. 2015, pp. 1-14.

\* cited by examiner

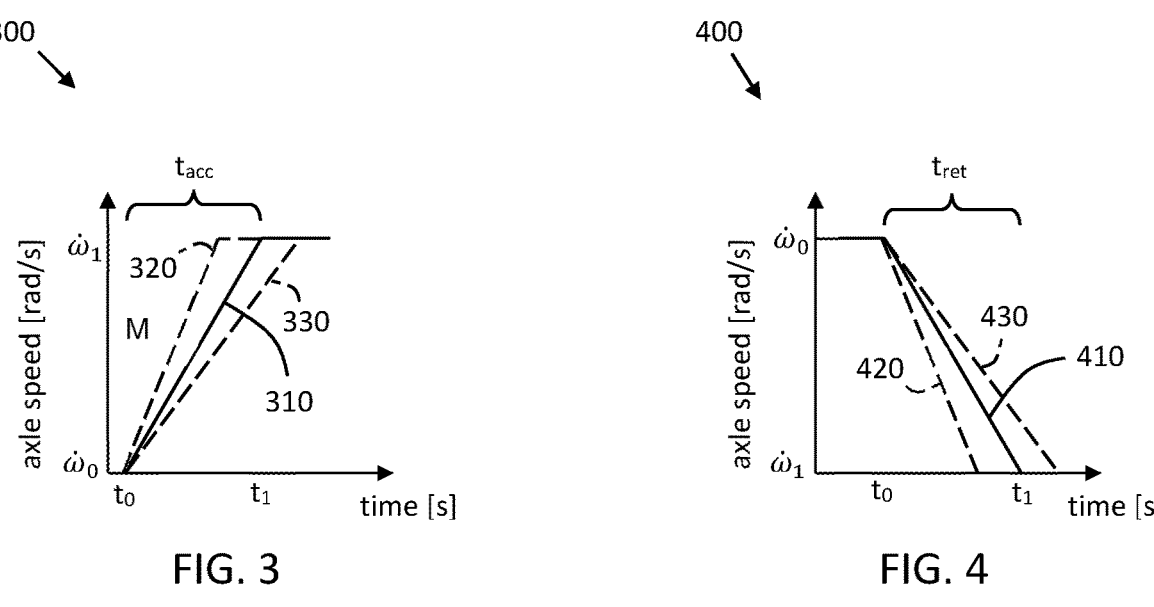
FIG. 3
FIG. 4
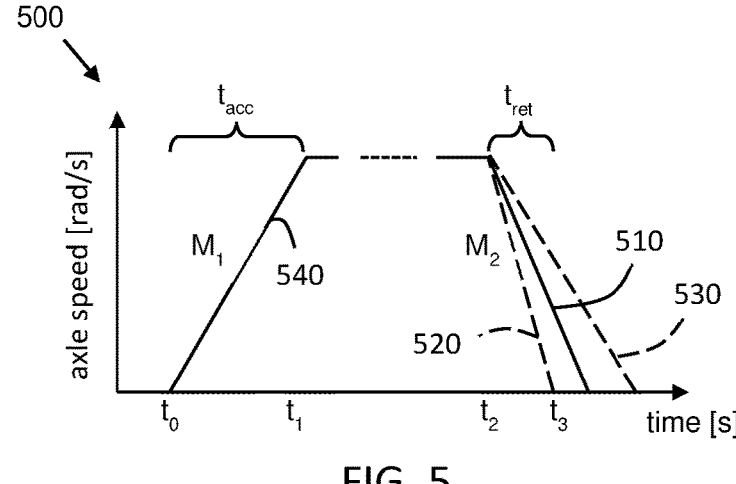
FIG. 5
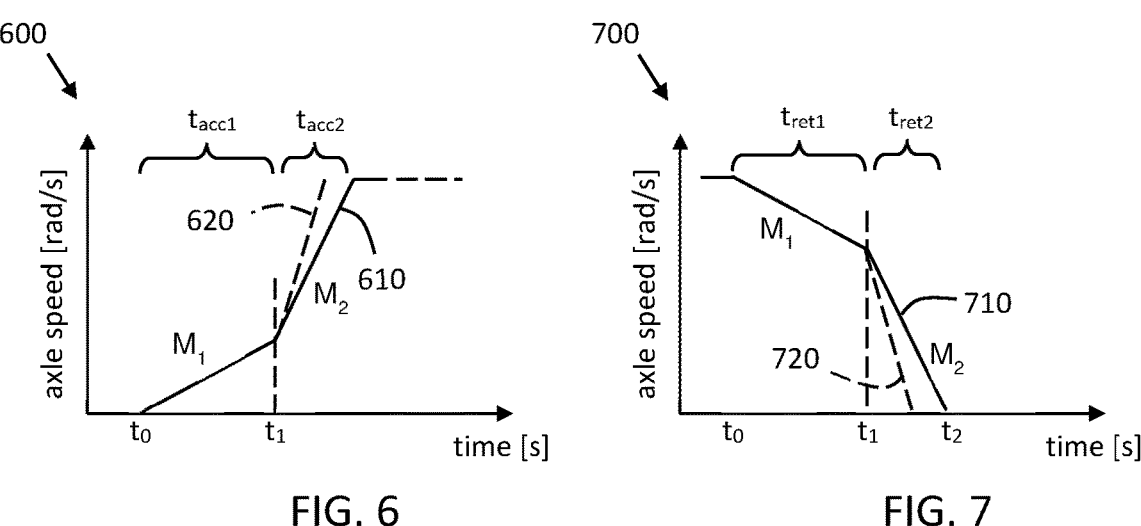
FIG. 6
FIG. 7

800

810
820
880
840
860
801
870
850
880
880
830

S1

S2

S3

101, 801, 1000

1010

1030

1020

1100

1110

1120

$$A_1 + A_2 = \int_{t_0}^{t_1} M_1(t)\,dt + \int_{t_1}^{t_2} M_2(t)\,dt = J(\omega(t_2) - \omega(t_0))$$

$$\int_{t_0}^{t_1} M_1(t)\,dt = \int_{t_1}^{t_2} M_2(t)\,dt \rightarrow \omega(t_2) - \omega(t_0) = 0$$

CONTROL UNIT AND METHOD FOR BELT SLIP DETECTION IN CONSTRUCTION EQUIPMENT

TECHNICAL FIELD

The present disclosure relates to construction equipment such as hand-operated power cutters, floor grinders, power trowels, floor saws, compactors, and other belt driven machines. There are disclosed methods for detecting drive belt slip and also for triggering actions in response to detecting a drive belt slip.

BACKGROUND

Construction equipment such as hand-held power cutters, floor grinders, power trowels, floor saws, compactors, and the like often comprise drive arrangements where torque is transferred from a motor axle to one or more tool axles or other actuators on the equipment via pulleys and a drive belt.

It is important that the drive belt is in good condition, has a suitable dimension, and is installed with correct tension, since otherwise the drive belt may slip excessively relative to one or more of the pulleys during use. Such slip prevents torque from being effectively transferred between motor and tool, and therefore negatively affects the performance of the machine. Belt slip may also reduce the performance of a tool braking system which uses the drive arrangement to slow down the tool.

It is known to use axle speed measuring devices to determine belt slip, see, e.g., GB2243730. Rotary encoders such as Hall effect sensors are then used to measure the speed of the motor axle in relation to the speed of the tool axle, whereupon the belt slip can be determined based on the difference between the two axle speeds. Such sensors may however fail, and also add cost and complexity to the overall machine assembly.

Reliable and cost effective systems for detecting belt slip are desired.

SUMMARY

It is an objective of the present disclosure to provide reliable and cost-effective mechanisms for detecting belt slip in drive arrangements for use with various forms of construction equipment. This objective is obtained by a control unit configured to detect belt slip in a drive arrangement which comprises pulleys and at least one drive belt arranged to connect a motor axle to one or more tool axles of the construction equipment. The control unit comprises processing circuitry configured to obtain an expected amount of effort required to accelerate the motor axle from a first velocity to a second velocity, measure an actual amount of effort required to accelerate the motor axle from the first velocity to the second velocity, and detect belt slip in the drive arrangement in case the expected amount of effort exceeds the measured actual amount of effort by a margin. In other words, if it requires less effort than expected to change the speed of the motor axle, then belt slip is declared.

The belt slip detection mechanism only requires measurements of the behavior of the motor axle in response to an applied torque, i.e., there is no need for axle speed sensors arranged both at the motor axle and at a tool axle, which is an advantage. The control unit is able to detect belt slip in a reliable and computationally efficient manner, both for positive as well as negative acceleration of the motor axle, i.e., both when bringing the tool up to working speed and when braking the tool to reduce the tool speed. The margin can be used to set the sensitivity of the detection mechanism in a convenient and intuitive manner.

The expected amount of effort and the actual amount of effort may comprise various metrics usable separately or in combination. Suitable metrics of effort may comprise, e.g., an angular impulse required to accelerate the motor axle from the first velocity to the second velocity, a torque applied to the motor axle to accelerate the motor axle from the first velocity to the second velocity in a given period of time, and/or an acceleration exhibited by the motor axle in response to a given torque applied to the motor axle. Different metrics may be suitable for use with different types of construction equipment and operating modes. Combinations of the different metrics can also be used in order to obtain a more reliable detection mechanism. It is an advantage that the belt slip detection methods discussed herein can be used with different metrics. For instance, the belt slip detection methods are applicable together with tools configured to provide a constant and/or a known motor axle acceleration and also with tools configured to provide a constant and/or a known motor axle torque. Some machines increase axle speed at a constant acceleration and reduce axle speed by applying a constant torque. Detection of belt slip in such machines benefit from the versatility of the techniques for belt slip detection proposed herein.

The processing circuitry in the control unit may for instance be configured to obtain an expected acceleration of the motor axle in response to a given torque applied to the motor axle as a pre-determined reference acceleration. This way an actual acceleration of the motor axle in response to a given torque can be measured continuously or periodically and compared to the stored reference acceleration, and the belt slip detection can then be based on the comparison, providing a belt slip detection mechanism which is both reliable, of low computational complexity, and quick to respond in case of belt slip onset. The belt detection mechanism can be implemented in control units which lack powerful processing ability, which is an advantage. The processing circuitry can be configured to measure the reference acceleration behavior of a given machine during a calibration procedure, and to store the measured reference acceleration in memory. Thus, by performing the calibration procedure the data in memory can be kept up to date and relevant for the tool, which improves the reliability of the detection.

The processing circuitry can also be configured to obtain data indicative of a tool inertia of a tool arranged to be driven by the drive arrangement, and to determine the expected amount of effort for changing motor axle speed based on the tool inertia. The tool inertia may for instance be determined based on a measured acceleration of the motor axle in response to a reference torque applied to the motor axle. The tool inertia may also be at least partly pre-configured in memory, input to the control unit manually, read out from the tool and/or obtained from a remote server or a wireless device.

The relationship between the inertia of a rotating system, its acceleration and torque applied to the system is generally known and will therefore not be discussed in detail herein. Various models and approximative relationships can be used to relate applied torque and time period to speed change and inertia at different degrees of approximation. For instance, given tool inertia $J$, the expected angular mechanical impulse $M(t_1-t_0)$ that is required to change the speed of a motor axle from one axle speed $\omega_0$ to another axle speed $\omega_1$ from time $t_0$ to time $t_1$ can be determined from the expression

3

$$\int_{t_0}^{t_1} (M + M_0)dt = \int_{\omega_0}^{\omega_1} (J + J_0)d\omega$$

where M is the applied torque, $M_0$ represents friction losses and the like, J is the tool inertia and $J_0$ summarizes contributions to system inertia from other rotating components in the system, i.e., $J+J_0$ is the total system inertia. The applied torque M is in most cases significantly larger than $M_0$. In case J is also significantly larger than $J_0$, the expression simplifies to:

$$J(\omega_1 - \omega_0) \approx M(t_1 - t_0)$$

where M is a constant torque. If needed, $M_0$ and $J_0$ can be handled as calibration parameters. I.e., if either $M_0$ and/or $J_0$ are large enough to have a significant effect on the system, then they can be included in the model. Their values can be pre-configured or measured during a calibration operation involving, e.g., a reference tool having known inertia.

Given the tool inertia J various metrics of expected effort can be determined, e.g., by fixing the torque or by fixing the time $t_1-t_0$ to change the motor axle speed.

The control unit may furthermore be arranged to determine a rotation speed $\omega_0$ of the motor axle based on one or more characteristics of an electric current drawn over an interface to the electric motor, such as the frequency of the current on the motor interface or phase relationship over time. The control unit for detecting belt slip may advantageously be integrated with a control unit for controlling an electric motor, which then already knows the axle speed with high accuracy since this is an integral part of the electric motor control. Thus, the belt slip detection mechanisms disclosed herein can be implemented with little effort in an existing electric motor controller, especially since the detection methods can be realized with reasonable computational complexity. In case the control unit is also arranged to control an electric motor of the construction equipment to generate an amount of torque applied to the motor axle, then the electric motor knows both motor axle speed and applied torque, which allows it to perform the belt detection methods disclosed herein with no extra sensors, which is an advantage. In fact, the belt detection methods discussed herein allow construction of drive modules comprising control unit, electric motor and battery compartment which modules are capable of detecting belt slip without additional sensor input signals.

The control unit may also alternatively, or as a complement, determine a rotation speed of the motor axle based on an output signal from a rotary encoder arranged in connection to the motor axle. This rotary encoder may comprise a Hall sensor, or other form of transducer. The rotary encoder may also be realized from an existing generator or ignition module of a combustion engine, which is an advantage since existing hardware is then reused for belt slip detection purposes.

The control unit may furthermore be arranged to trigger a notification or warning to a user and/or external device in response to detecting belt slip in the drive arrangement. This way a user receives information that the drive arrangement is not functioning optimally, and can take action to resolve the belt slip issue, most likely before the belt slip issue has a chance to become a real problem, or even a hazard. The notification can, e.g., comprise a message on a display, a buzzer signal, a light signal, and/or a message transmitted via radio to an external device such as a remote wireless device or server.

The control unit may furthermore be arranged to modify and/or prevent an operation of the construction equipment in response to detecting belt slip in the drive arrangement. This improves the safety of using the construction equipment, especially if the drive arrangement is also used for braking the tool from an operating speed down to a reduced speed or stand-still. A malfunctioning drive belt may jeopardize the operation of such a tool braking function, which of course is highly undesired. However, by the belt slip detection mechanisms discussed herein, the user may receive warning before the situation becomes dangerous, and can service the drive arrangement in time before an accident occurs.

The control unit may also be arranged to detect malfunction in case the expected amount of effort is lower than the measured actual amount of effort by a margin, such as if a magnitude of a measured acceleration of the motor axle is below a magnitude of an expected acceleration of the motor axle by some amount. The malfunction may for instance comprise a discrepancy between assumed and actual tool dimension and/or tool type.

The objective is also obtained by construction equipment of various forms comprising a drive arrangement with pulleys and a drive belt arranged to connect a motor axle of the construction equipment to a tool axle of the construction equipment. The construction equipment further comprises a control unit arranged to detect belt slip by the drive belt based on a difference between an expected amount of effort required to accelerate the motor axle from a first velocity to a second velocity and an actual amount of effort required to accelerate the motor axle from the first velocity to the second velocity.

The construction equipment is optionally arranged to perform a first calibration routine, in which first calibration routine data indicative of a tool inertia of a tool arranged to be driven by an electric motor or combustion engine is determined and stored in a memory of the construction equipment.

The construction equipment is optionally also arranged to perform a second calibration routine, in which second calibration routine data indicative of a reference amount of acceleration achieved for a tool with a given tool inertia and an applied torque is determined and stored in a memory of the construction equipment.

The construction equipment may furthermore be arranged to perform a third calibration routine, in which third calibration routine data indicative of a reference amount of torque required to achieve a given acceleration of a tool having a given tool inertia is determined and stored in a memory of the construction equipment.

The construction equipment may also be arranged to perform a belt slip evaluation routine, in which belt slip evaluation routine a belt slip condition of the drive arrangement is evaluated, where the construction equipment is arranged to trigger an action in case belt slip is detected during the belt slip evaluation routine.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where

FIGS. 3-7 are graphs of electric motor axle speed vs time;

DETAILED DESCRIPTION

Figure 1:
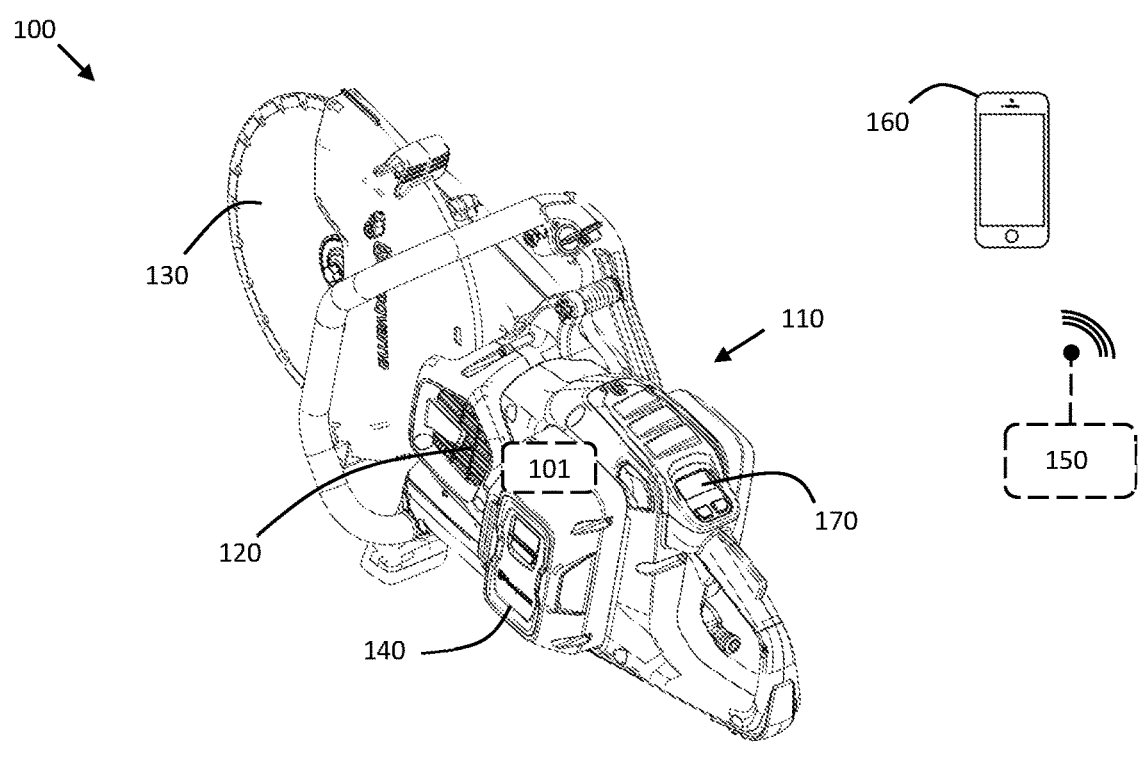
FIG. 1 shows an example power cutter.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 shows an example power cutter 100, i.e., a hand-held work tool for cutting hard material work objects. The power cutter 100 comprises a main body 110 with a motor 120 connected to a rotatable circular cutting tool 130 via a drive arrangement comprised in a power cutter tool arm.

The example power cutter 100 in FIG. 1 is a battery powered electric machine with an electric motor that draws its energy from a replaceable and rechargeable battery 140. Electric power cutters which are powered via cable from electrical mains are also known, as well as power cutters powered by combustion engines. The present disclosure is not limited to any particular form of power cutter, although the techniques discussed herein are most advantageously used in power cutters with electric motors, in particular electric motors controlled by an inverter control unit which has inherent knowledge of motor axle speed as part of the electric motor control function.

The power cutter 100 comprises a user interface 170, i.e., an input/output (I/O) device, where a user of the tool 100 can input various types of configuration data for operating the machine, such as the type of cutting disc connected to the tool. The user interface 170 may comprise any of a display, buttons, light-emitting-diode (LED) indicators, a buzzer and also a radio transceiver circuit arranged to communicate with a remote device such as a server 150 or a wireless device 160. The terms user interface and I/O device should be construed broadly to incorporate any type of interface towards a user or remote device.

Figure 2:
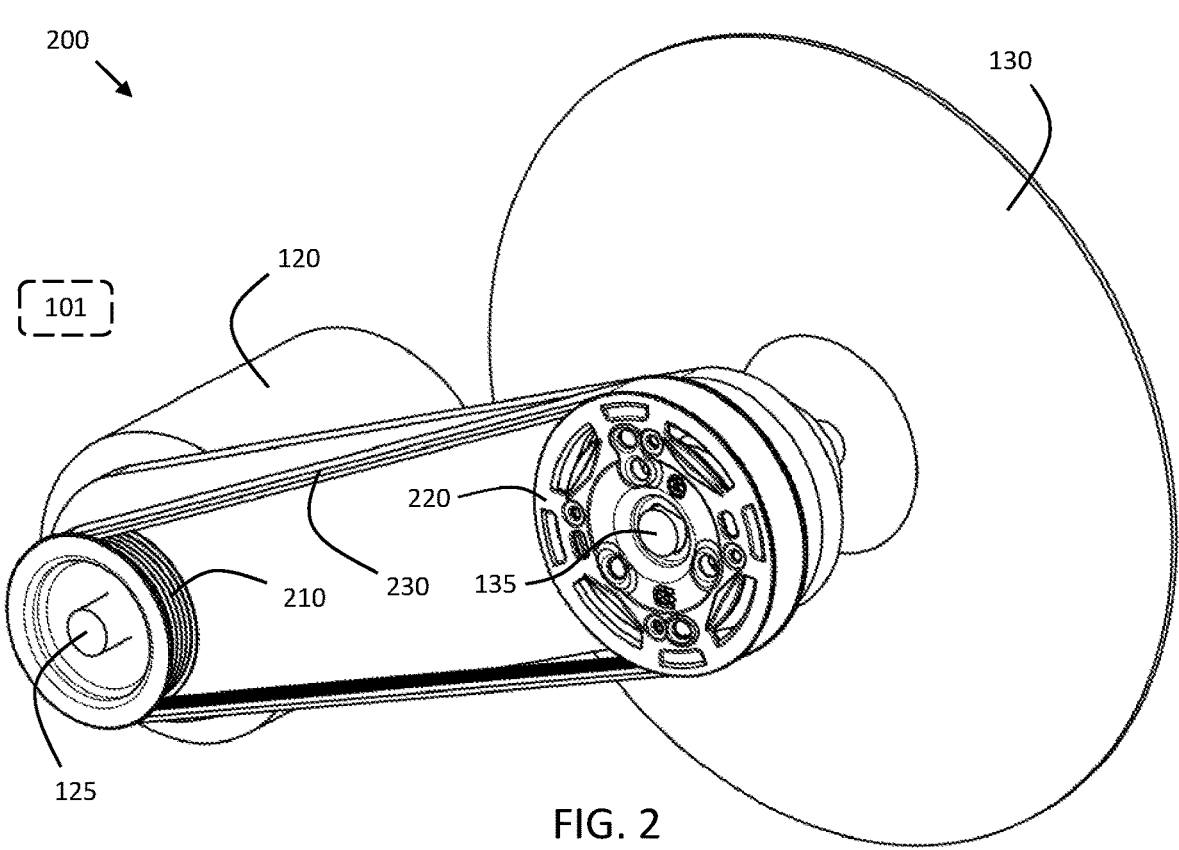
FIG. 2 illustrates an example drive arrangement.

FIG. 2 illustrates an example drive arrangement 200 comprising a first pulley 210 arranged to be driven by a motor axle 125 of an electric motor 120. A torque applied to the motor axle 125 is transferred via the first pulley 210 to a drive belt 230 which in turn drives a second pulley 220. The second pulley 220 is connected to a tool axle 135, whereby the circular cutting tool 130 is brought into rotation by the torque applied to the motor axle 125 by the electric motor 120. Any of the pulleys 210, 220 of the drive arrangement may of course also be connected to its respective axle via gears or the like. Such geared transmissions allow for the configuration of mechanical advantage in the system.

The techniques discussed herein are, in addition to power cutters, also more generally applicable to construction equipment comprising drive arrangements with pulleys and at least one drive belt arranged to connect a motor axle to one or more tool axles of the construction equipment. Some examples of such construction equipment include floor grinders, power trowels, floor saws, and compactors. The drive belt may in some cases connect a pulley attached directly to the motor axle to a pulley attached directly to the tool axle, and in some other cases form part of a system of drive belts which connect a motor axle to one or more tool axles, potentially via one or more intermediate belts and pulleys.

Figures 8, 9, 10, 11:
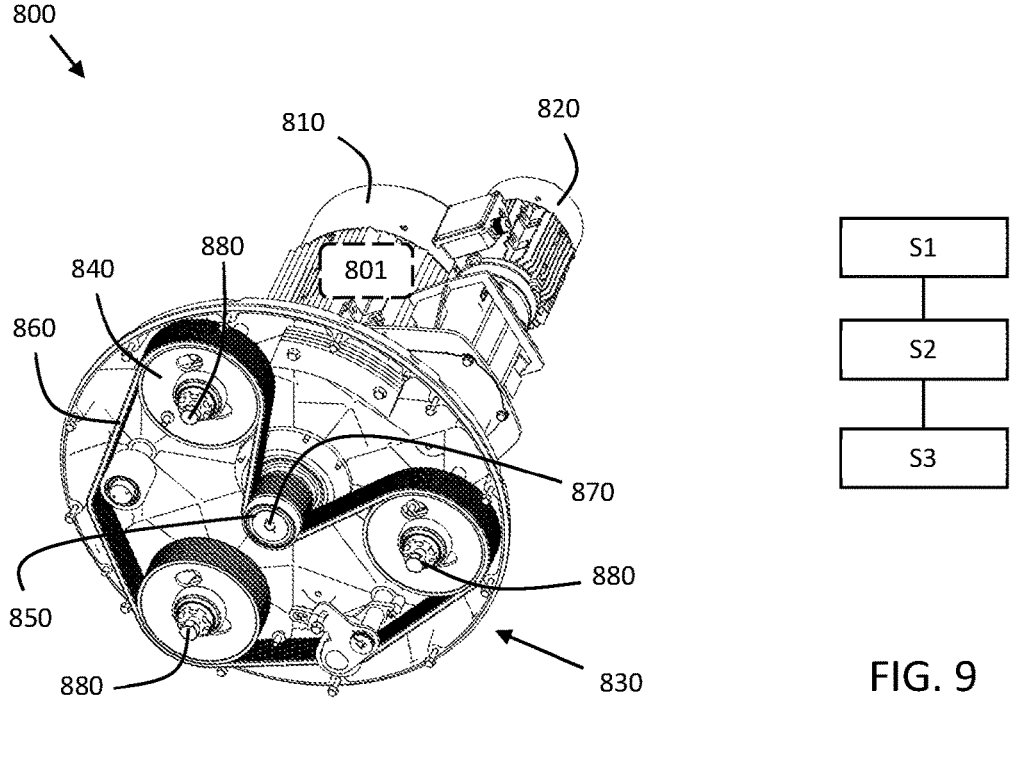
FIG. 8 illustrates another example drive arrangement.
FIG. 9 is a flow chart illustrating methods.
FIG. 10 illustrates a control unit comprising processing circuitry.
FIG. 11 illustrates a computer program product.

FIG. 8 illustrates an example drive arrangement 830, to which the techniques discussed herein are applicable. This type of drive arrangement is often used with planetary floor grinder assemblies 800 where a first electric motor 810 is used to rotate a set of grinding tools, and a second electric motor 820 is used to rotate the planet. This drive arrangement also comprises pulleys 840, 850 and a drive belt 860, which may exhibit unwanted excessive belt slip. In the same way as for the power cutter, an excessive belt slip may limit the amount of torque transferred from the motor axle 870 to the different tool axles 880. The floor grinder assembly 800 comprises a control unit 801 arranged to perform at least some of the techniques disclosed herein.

Drive belt slip refers to the situation when the driving pulley 210 moves faster than the drive belt 230 and/or when the driven pulley 220 moves slower than the drive belt. Drive belt slip S can for instance be defined as the loss of speed at the circumference of the output pulley 220 ($v_o$) relative to the speed at the circumference of the input pulley 210 ($v_i$), i.e., $$S = \frac{v_i - v_o}{v_i}$$

A small slip, often referred to as the drive belt elastic slip, is always present in a drive arrangement based on pulleys and non-rigid drive belt, due to drive belt elasticity and other factors. However, the drive belt 230 may in some undesired situations slip more substantially with respect to the pulleys. This occurs if the drive belt is subject to higher forces than can be supported by the friction between drive belt and the pulleys. Excessive belt slip is highly undesired, since it is detrimental to drive arrangement efficiency and may also cause hazard to a user of the tool, e.g., if the drive arrangement is used for braking the tool in addition to accelerating the tool.

It is desired to detect when excessive belt slip occurs. In this regard, excessive belt slip is a belt slippage above the normal elastic belt slippage expected for a given type of machine. According to an example, excessive belt slip may be defined as a belt slippage above 5%, such as on the order of 15-20% or so. However, it is appreciated that different types of machines are associated with different degrees of sensitivity to belt slip. What constitutes excessive belt slip therefore differs from machine to machine.

The power cutter 100 comprises a control unit 101 which is arranged to detect when excessive belt slip occurs. The belt slip detection methods discussed herein can for instance be implemented as software in control units for construction equipment which are arranged to perform a belt slip test routine function continuously, periodically and/or on request by a user. By ensuring that a belt slip test routine is performed regularly, such as during machine servicing or at the start of a work shift, the likelihood of excessive belt slip during machine use can be reduced significantly. A control unit 101 on a machine such as a power cutter can be configured to periodically request the user to perform a belt slip test routine. This test routine may comprise instructions provided to the user via a user interface such as the user interface 170 of the power cutter in FIG. 1, instructing the user to perform various controlled accelerations of the tool, whereupon the condition of the drive arrangement with respect to belt slip can be evaluated by the control unit 101. For example, a controlled smaller acceleration of the tool can be performed to obtain an estimate of the inertia of the tool and the drive arrangement, followed by a strong acceleration which could trigger excessive belt slip in case the drive belt is not correctly installed or worn out. In case excessive belt slip is detected, one or more actions can be triggered by the control unit 101, such as a notification or alarm via the I/O device on the machine, transmission of a message to the remote server 150, or a notification sent to the wireless device 160.

In case the construction equipment 100, 800 is part of a fleet of equipment, then a message can be sent to an operations and maintenance function of the fleet operator, indicating that the drive arrangement is in need of inspection and/or servicing.

The power cutter 100 can be driven by an electric motor or by a combustion engine. At least some parts of the techniques disclosed herein are applicable to both types of tools. The combustion engine power cutter needs some form of sensor or device which can be used to measure the acceleration $\dot{\omega}$ of the motor axle and/or speed $\omega$ of the motor axle in response to an applied torque, where $\dot{x}$ denotes time derivative of x. This sensor can, for instance, be a separate dedicated sensor such as a Hall effect sensor or a rotary encoder of some sort. However, existing devices such as combustion engine ignition modules or generator devices can also be used to measure axle speed. A generator based on rotating magnets can for instance be made to indicate axle speed by removing a magnet in order to create a reference signature in the generator output which is indicative of axle speed.

Construction equipment comprising electric machines have the advantage that motor axle speed is often already available as an internal parameter to the control unit 101 since the motor axle speed is an integral part of the inverter control of the electric motor. However, an electrically powered machine can of course also use rotary encoders to determine motor axle speed, in addition to the axle speed provided from the electric motor control or as an alternative to the axle speed provided from the electric motor control.

Construction equipment implementing the belt slip detection methods discussed herein can be configured to perform a first calibration routine, in which first calibration routine data indicative of a tool inertia J of a tool 130 arranged to be driven by the electric motor 120 or combustion engine is determined and stored in a memory 1030 of the construction equipment. This first calibration routine can, for instance, comprise mounting a reference tool to the tool axle of known inertia. The motor axle can then be carefully accelerated, while making sure that no excessive belt slip occurs. It is also possible to perform a second calibration routine where data indicative of a reference amount of acceleration achieved for a tool 130 with a given tool inertia J and an applied torque M is determined and stored in a memory 1030 of the construction equipment. A third type of calibration routine can be used to obtain data indicative of a reference amount of torque M required to achieve a given acceleration of a tool 130 having a given tool inertia J is determined and stored in the memory 1030 of the construction equipment.

The construction equipment can also be arranged to perform a belt slip evaluation routine, in which belt slip evaluation routine a belt slip condition of the drive arrangement is evaluated. A user of the machine, or a service technician, may be requested by the tool, e.g., via the user interface 170, or by some other entity to perform an acceleration of the tool without engaging into a work operation such as a cutting operation or a grinding operation. The user or the service technician can in some cases also configure the tool in a belt slip test mode, whereupon the user or service technician can proceed to accelerate the tool in order to determine if the drive belt is fully functional or in need of service and/or replacement.

The belt slip detection mechanisms discussed herein are based on the application of a torque to the motor axle of the construction equipment, and on a comparison between an expected amount of effort required to accelerate the motor axle from a first velocity $\omega_0$ to a second velocity $\omega_1$ and an actual amount of effort required to accelerate the motor axle from the first velocity $\omega_0$ to the second velocity $\omega_1$. In case the expected amount of effort exceeds the measured actual amount of effort by a margin, then belt slip in the drive arrangement is declared. Intuitively, if the friction between belt and drive pulley is too low, then it will be much easier to accelerate the motor axle compared to if the friction is high (as it should be). A slipping belt will therefore make it easier to accelerate the motor axle compared to if the belt is not slipping. The acceleration of the motor axle may be either a positive or a negative acceleration (a retardation) in response to the applied torque (which consequently may be a positive or a negative torque).

The concept of effort to change speed of the motor axle is to be given a broad interpretation herein. There are at least three possible ways in which effort can be determined: measuring the angular mechanical impulse required to change motor axle speed, measuring the torque required to achieve a given acceleration, and measuring the acceleration that results from application of a given torque.

As illustrated in FIG. 3, with everything normal (no excessive belt slip or other deviant behaviors) and with a known tool inertia J, the motor axle will accelerate 310 from a rotation speed $\omega_0$ at time $t_0$ to a rotation speed $\omega_1$ at time $t_1$ in response to an applied torque M during the time period $t_1-t_0$, since $$J(\omega_1 - \omega_0) \approx M(t_1 - t_0)$$

at least according to an approximation. If the belt is slipping, the time to accelerate the motor axle with the same torque M will be smaller than $t_1-t_0$, as illustrated by the dashed line 320, since the resistance to acceleration by the tool and drive arrangement is smaller. It is appreciated that the relationships between inertia, axle speeds, applied torque and time which are used herein to detect belt slip are normally approximations which leave out smaller contributions from insignificant systems components. Such discrepancies can be handled by introduction of detection margins or by calibration. Some more advanced versions of the detection methods discussed herein may comprise calibration parameters that can be configured to account for approximation errors incurred by modelling errors.

Generally, effort can be measured in terms of the acceleration which results when a given torque is applied to the motor axle, where a higher acceleration for a given torque means that it takes less effort to accelerate the motor axle compared to some reference operation. If a motor axle suddenly starts to accelerate more rapidly than expected, then belt slip may be the cause.

Effort can also be measured in terms of the torque required to accelerate the motor axle at a given acceleration. The more torque it takes to maintain a given acceleration, the more effort it takes to accelerate the motor axle. If all of a sudden it takes much less torque than it normally does to accelerate a motor axle at a given acceleration, then excessive belt slip may be suspected.

Effort can furthermore be measured in terms of the angular mechanical impulse $M(t_1-t_0)$ required for a given speed change $\omega_1-\omega_0$ at some inertia J. If the required angular mechanical impulse for accelerating a motor axle from $\omega_0$ to speed $\omega_1$ suddenly decreased from an expected amount of angular mechanical impulse, then belt slip can be declared.

Referring to FIG. 3 again, if the assumed tool inertia J used in the calculations is smaller than the true inertia of the physical system, then the time duration to accelerate the tool for the same applied torque will be longer, as illustrated by the dashed line 330. A difference between the assumed applied torque used in calculations and the actual torque applied to the motor axle can also give a difference between the predicted time to accelerate the motor axle and the actual time to accelerate the motor axle.

With reference also to FIG. 10, the techniques for belt slip detection based on expected and actual effort to accelerate a motor axle can be implemented in a control unit 101, 801, 1000 for construction equipment 100, 800, configured to detect belt slip in a drive arrangement 200, 830. The drive arrangement 200, 830 comprises pulleys 210, 220, 840, 850 and at least one drive belt 230, 860 arranged to connect a motor axle 125, 870 to one or more tool axles 135, 880 of the construction equipment 100, 800. The construction equipment may, e.g., be a power cutter 100 as illustrated in FIG. 1 or a floor grinder as illustrated in part in FIG. 8, or some other form of belt driven machine such as a compactor, floor saw or power trowel which uses a drive arrangement comprising pulleys and a drive belt for transferring torque between a motor axle and one or more tool axles. The control unit 100 may also form part of a drive module comprising an electrical energy source and an electric motor.

The control unit 101, 801, 1000 comprises processing circuitry 1010 configured to obtain, estimate or otherwise predict an expected amount of effort required to accelerate the motor axle 125 from a first velocity $\omega_0$ to a second velocity $\omega_1$. The first velocity is smaller than the second velocity in case the acceleration of the motor axle is positive, and vice versa if the acceleration of the motor axle is negative, i.e., if the motor axle is instead braked from the first velocity down to the second velocity. In essence, the expected amount of effort represents the situation "as it should be" with a fully functioning drive belt without excessive belt slip. The control unit is also arranged to measure or at least obtain information associated with an actual amount of effort required to accelerate the motor axle 125 from the first velocity $\omega_0$ to the second velocity $\omega_1$, and detect belt slip in the drive arrangement 200, 830 in case the expected amount of effort exceeds the measured actual amount of effort by a margin.

The actual amount of effort required to accelerate the motor axle 125 represents the situation "as it is". If the expected effort is larger than the effort which is actually required to change the motor axle speed, then it is likely that the belt is slipping. Consider for instance the extreme case where the belt is missing, then it will be very easy to accelerate the motor axle. The margin used in the detection process can be pre-configured as a fixed margin or adapted by a service technician or user. A user may for instance find the belt slip detection mechanism too sensitive, in which case he or she may increase the margin to obtain a less sensitive belt slip detection mechanism, since the smaller the margin is the more sensitive the detection mechanism will be. The margin can be configured in dependence of tool type, in dependence of machine type, and/or in dependence of user preference.

The expected amount of effort and the actual amount of effort may comprise an angular impulse $M(t_1-t_0)$ required to accelerate the motor axle 125 from the first velocity $\omega_0$ to the second velocity $\omega_1$, a torque M applied to the motor axle 125, 870 to accelerate the motor axle 125 from the first velocity $\omega_0$ to the second velocity $\omega_1$ in a given period of time $t_1-t_0$ and/or an acceleration $\alpha$ of the motor axle 125, 870 in response to a given torque M applied to the motor axle 125, 870. Combinations of angular mechanical impulse, required torque, and resulting acceleration in response to a torque can of course also be used. For instance, the belt slip detection system can be configured to verify that an increase in tool speed from the first velocity $\omega_0$ to the second velocity $\omega_1$ at a target (fixed) acceleration requires an expected amount of applied torque. This principle is suitable for machines which control the motor to increase axle speed at a fixed acceleration. A heavier tool attached to the motor axle then means that the motor draws more current (which is indicative of applied torque) than it would for a lighter tool. In other words, the higher the inertia J the more current will be drawn by the motor. The system can then detect belt slip if the motor draws less current than expected (corresponding to a smaller torque than expected required to accelerate the motor axle). Other systems use a constant torque M applied to the motor axle to change motor axle speed from the first velocity $\omega_0$ to the second velocity $\omega_1$. For instance, a machine may use a constant torque to slow down the motor axle from a high speed to a low speed or to stand-still. It will then take longer time to slow down a motor axle if the inertia J is large compared to if the inertia is smaller. If it takes less time than expected to slow down the motor axle, then belt slip can be suspected.

The processing circuitry 1010 can, for instance, be configured to obtain an expected acceleration of the motor axle 125, 870 in response to a given torque M applied to the motor axle 125, 870 as a pre-determined reference acceleration stored in memory 1030. The reference acceleration can for instance be determined during a calibration procedure. Similar calibration procedures can also be performed for determining a reference torque required to maintain a given magnitude of acceleration, or a reference angular mechanical impulse required for changing the speed of an axle connected to a tool having a given inertia.

The processing circuitry 1010 of the control unit 101, 801, 1000 can be configured to obtain data indicative of a tool inertia J of a tool 130 arranged to be driven by the drive arrangement 200, 830, and to determine the expected amount of effort based on the tool inertia J. Alternatively, or as a complement, the control unit can be arranged to determine the tool inertia J based on a measured acceleration of the motor axle 125, 870 in response to a reference torque $M_1$ applied to the motor axle 125, 870. This reference torque $M_1$ is then preferably smaller than a torque M applied to the motor axle 125, 870 for belt slip detection. The reason for wanting to use a relatively small torque for determining tool inertia is that the small torque is less likely to result in excessive belt slip.

The data indicative of the tool inertia J may furthermore at least partly be pre-configured in memory 1030, input to the control unit 101, 801, 1000 manually, read out from the tool 130 and/or obtained from a remote server 150 or a wireless device 160. This means that the control unit 101 may comprise a memory unit in which the tool inertia data can be stored. The memory optionally comprises inertia data associated with more than one type of tool. This allows a user to simply select which tool that is currently mounted on the machine, whereupon the control unit 101 can determine which tool inertia to use during slip detection.

An operator or service technician can input the actual inertia to use when detecting belt slip. For example, an operator or service technician can use a wireless device, such as the wireless device 160, to input the data from a table of pre-determined inertias associated with a set of test tools.

The motor axle acceleration used for the detection of belt slip can be measured by the control unit, e.g., as a difference in rotation speed of the motor axle 125, 870 over a given time period. Suppose that the motor axle speed of rotation at time $t_0$ is $\omega_0$ and that the motor axle speed of rotation at time $t_1$ is $\omega_1$, then the acceleration $\alpha$ can be approximated as $$a \approx \frac{\omega_1 - \omega_0}{t_1 - t_0}$$

To perform the measurement of axle speed a rotary encoder can be used, such as a Hall effect sensor or other form of sensor arranged in connection to the motor axle. A generator on the construction equipment can also be used, for instance if one or more magnets used by the generator assembly is removed in order to create an axle position reference. An ignition system of a combustion engine powered machine can also be used for determining motor axle speed.

The motor axle speed can also be determined directly based on one or more characteristics of an electric current drawn over an interface to an electric motor 120 if the machine is electrically powered, such as a frequency and/or phase relationship of one or more current components. An inverter that controls an electric motor has accurate knowledge of the axle speed at all times, since this parameter is an integral part of the control of the electric motor. Thus, the control unit arranged to detect belt slip is advantageously combined with the function for controlling the electric motor. In this case the control unit can of course also be arranged to control the electric motor 120 to generate the torque applied to the motor axle 125, 870. The control unit

101, 801 then has knowledge of both axle speed and applied motor axle torque at all times.

Other ways of measuring acceleration are of course conceivable. For instance, acceleration in response to an applied torque can be measured directly using a speed sensor, a tachometer or an inertial measurement unit (IMU) mounted to the motor axle.

It is appreciated that an applied torque can be determined in many different ways, and the present disclosure is not limited to any particular way of determining torque. In fact, the actual applied torque need not be known exactly, it is enough that the expected response by the motor axle to an applied torque is approximately known, and that the same torque can be applied repeatedly. For instance, suppose that a reference time period $t_1-t_0$ for acceleration 310 from stand-still to full throttle speed is determined and stored in memory, as illustrated in FIG. 3. This reference time period can then be compared to a measured time duration obtained during a belt slip test. In case the measured time period is shorter than the reference time period by an amount, then excessive belt slip can be declared by the control unit.

A similar principle can be applied if torque is the metric of effort used to detect belt slip, i.e., if an electric motor of the tool is controlled to always generate the same motor axle acceleration. The current drawn by an electric motor will be indicative of the torque applied to the motor axle. Hence, if a reference current value indicative of "normal" applied torque is measured and stored, an actual current drawn during operation can then be compared to the reference current and belt slip detection can be declared if the actual current becomes smaller than the reference current by a margin.

FIG. 4 illustrates the same example as in FIG. 3, but for retardation, i.e., negative acceleration during braking of the tool where the first velocity $\omega_0$ is larger than the second velocity $\omega_1$. The solid line 410 illustrates the expected acceleration of the motor axle 125, 870. If the actual acceleration of the motor axle exceeds the expected acceleration by some pre-determined margin, as illustrated by the dashed line 420, excessive belt slip is likely. The expected acceleration 410 can as described above be determined using data indicative of tool inertia, i.e., using the relationship between acceleration $(\omega_1-\omega_0)/(t_1-t_0)$, inertia J, and applied torque M, $$J(\omega_1 - \omega_0) \approx M(t_1 - t_0)$$

Alternatively, the expected acceleration of the motor axle can be obtained as a pre-determined reference acceleration, i.e., the time $t_1-t_0$ for decelerating the motor axle from full speed $\omega_1$ to idle speed $\omega_0$ or stand-still can be predetermined and stored in memory. If the time to stop the motor axle suddenly becomes shorter, i.e., if the deceleration time goes from $t_1-t_0$ to some shorter time duration, then belt slip can be detected.

In case the tool inertia is unknown, the control unit can also obtain the data indicative of the tool inertia by a reference acceleration, as exemplified in FIG. 5. The control unit is in this example arranged to determine the data indicative of the tool inertia J based on a measured acceleration 540 of the motor axle 125, 870 in response to a reference torque $M_1$ applied to the motor axle 125, 870. The control unit applies the reference torque $M_1$ to the motor axle and measures the response in terms of acceleration. The tool inertia can then be determined using an expression such as

US 12,650,363 B2

13                                                                  14

$$J \approx \frac{M_1(t_1 - t_0)}{(\omega_1 - \omega_0)}$$

The control unit can then apply another torque $M_2$ to the motor axle and measure the acceleration in response to the torque $M_2$. If this measured acceleration corresponds to the expected acceleration 510 determined using the estimated tool inertia, then all is as it should. However, in case the measured acceleration differs from the expected acceleration, then something may be amiss. A belt slip can be detected if the measured actual acceleration of the motor axle is larger than the expected acceleration by an amount, as illustrated by the dashed line 520. A smaller magnitude acceleration 530 can also indicate some form of malfunction.

The reference torque $M_1$ in the example of FIG. 5 is preferably smaller than the torque $M_2$ applied to the motor axle 125, 870 by an amount. This is because it is desired to avoid excessive drive belt slip when performing the reference measurement that determines the tool inertia, which can be achieved by limiting the reference torque.

According to another example, a torque "pulse" can be applied to the motor axle. This pulse then comprises a first and second acceleration of opposite signs. The response of the system to the pulse can then be used to, e.g., determine tool inertia and/or to detect belt slip. The pulse preferably comprises a portion of strong torque (which may cause belt slip) and a portion of weaker torque but of longer time duration (not as likely to cause belt slip). The pulse can then be designed to result in an expected motor axle speed change, such as no change if the torques are expected to cancel out.

Figure 12:
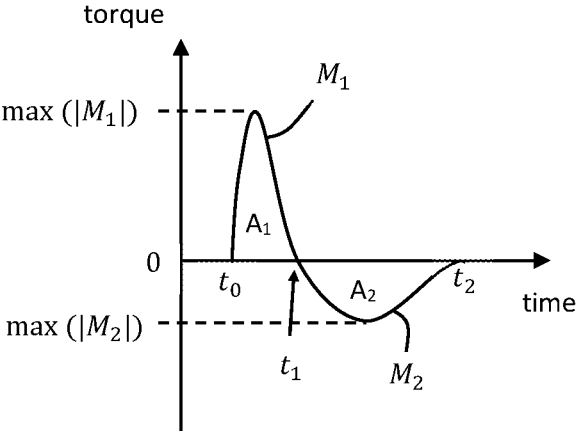
FIG. 12 illustrates an example torque pulse applied to a motor axle.

FIG. 12 illustrates one such example of a torque pulse which can be used to detect belt slip and/or to determine one or more system parameters such as the tool inertia J. A first torque $M_1$ is first applied at time $t_0$, the area under the curve is $A_1$. A second torque $M_1$ of opposite sign is then applied at time $t_1$ up to time $t_2$, with an area under the curve of $A_2$. Now, if the two areas are the same, then the expected response by the system is terms of motor axle speed change should be zero, since $$\int_{t_0}^{t_1} M_1(t)dt = -\int_{t_1}^{t_2} M_2(t)dt \rightarrow \omega(t_2) - \omega(t_0) = 0$$

This can be used in a belt slip detection routine, by configuring the pulse with a difference in magnitude torques as shown in FIG. 12, and then checking if the motor axle speed after the pulse has changed by some amount greater than a margin. If there is a speed change, then the belt may have slipped during application of the torque pulse.

The actual speed change of the motor axle can also be compared to an expected speed change, i.e., by using the relationship $$A_1 + A_2 = \int_{t_0}^{t_1} M_1(t)dt + \int_{t_1}^{t_2} M_2(t)dt = J(\omega(t_2) - \omega(t_0))$$

Belt slip can be detected if the actual speed change differs from an expected speed change by more than a margin.

FIG. 6 illustrates another example 600 of the belt slip detection techniques disclosed herein. In this case a first torque $M_1$ is initially applied to the motor axle and the response in terms of acceleration is measured (from time $t_0$ to time $t_1$). This data can be used by the control unit to determine the tool inertia if this inertia is not already known. If the control unit has access to stored data about the tool inertia, then the measurement during the application of the torque $M_1$ can be used to refine or to verify the tool inertia data. The applied torque is then increased, at time $t_1$, to a higher torque $M_2$. Now, in case the measured acceleration 620 is of higher magnitude than the expected acceleration 610 determined based on the tool inertia, then belt slip can be declared.

FIG. 7 illustrates yet another example 700, where essentially the same procedure as in FIG. 6 is performed but during negative acceleration, i.e., retardation of the motor axle. A reference torque $M_1$ is first applied at time $t_0$, followed by a larger torque $M_2$ applied at time $t_1$. The acceleration by the motor axle in response to the torque $M_1$ can be measured during the time period $t_0$-$t_1$, and the tool inertia can be determined from this measurement. The tool inertia data thus determined can then be used to determine an expected acceleration 710 by the tool to a larger torque $M_2$. If the measured acceleration of the motor axle has a higher magnitude than the measured acceleration, after addition of some margin value, the belt slip can be declared.

It is of course also possible that $M_1$ and $M_2$ are of different sign. The reference torque can for instance be a positive torque while the torque applied for belt slip detection is a negative torque.

The same principles as illustrated in FIG. 3-7 can be applied also to expected and actual efforts involving constant and/or known acceleration by a variable torque applied to the motor axle, in which case a reference torque can be determined and stored in memory, and later compared to an actual torque required for the acceleration. The same principles can also be applied to expected and actual efforts comprising angular mechanical impulse. A reference angular mechanical impulse can be determined, e.g., by a calibration routine or otherwise obtained, and then compared to an actual angular mechanical impulse applied to the motor axle in order to change the speed of rotation of a motor axle associated with a given tool inertia.

The control unit 101, 801, 1000 may furthermore be arranged to trigger a notification to a user and/or external device 150, 160 in response to detecting belt slip in the drive arrangement 200, 830. For instance, the notification may involve any of a message on the display 130, a buzzer signal, a light signal, and/or a message transmitted via radio to the external device 150, 160. This notification alerts the operator of the fact that the drive arrangement is suffering from excessive belt slip, allowing the operator to take action, such as servicing the machine. According to some aspects, the control unit 101, 801, 1000 may be arranged to trigger the notification after having detected more than one instance of belt slip in a given time period. For instance, if the expected amount of effort exceeds the measured actual amount of effort by the margin more than a configurable number of times in a given time period. It may also be advantageous to configure a different margin in case the expected amount of effort exceeds the measured actual amount of effort often. For instance, a test variable can be defined as the sum differences between the expected amount of effort and the measured actual amount of effort can be compared to a threshold. Thus, if the expected amount of effort exceeds the measured actual amount of effort by a small amount but very often, then belt slip can also be declared.

The control unit 101, 801, 1000 may furthermore be arranged to modify or even prevent an operation of the construction equipment 100, 800 in response to detecting belt slip in the drive arrangement 200, 830. The control unit may for instance limit the maximum amount of torque applied to the motor axle during operation if excessive belt slip has been detected, e.g., in order to compensate for the reduction in braking performance which is caused by the belt slip. Alternatively, a machine associated with a detected excessive belt slip may be inactivated by the control unit, such that it cannot be used until the belt has been replaced or otherwise serviced.

The measured actual acceleration by the motor axle in response to the applied torque may also, as exemplified in FIGS. 3-5 be smaller than the expected acceleration. This may for instance be indicative of errors in one or more parameters. For instance, if the measured acceleration is smaller than the expected, then this may indicate that another type of tool than the assumed tool associated with the assumed tool inertia is mounted to the machine. The occurrence of a smaller magnitude acceleration compared to the expected acceleration can also be indicative of faults in the parameterization of the belt slip detection process, and/or erroneous motor data, which may be resolved by re-calibrating the control unit.

To summarize, the control unit 101, 801, 1000 may, according to some aspects, be arranged to detect malfunction and/or calibration error in case the measured actual amount of effort exceeds the expected amount of effort exceeds, i.e., if it takes more effort than expected to accelerate the motor axle. For instance, if a magnitude of the measured acceleration 330, 430 of the motor axle 125, 870 is below a magnitude of the expected acceleration 310, 410 of the motor axle 125, 870 by some margin, then malfunction can be detected. The malfunction can for example comprise a discrepancy between assumed and actual tool dimension and/or type.

FIG. 9 is a flow chart illustrating a method performed in a control unit 101, 801, 1000 for construction equipment 100, 800 which summarizes the above discussions. The method is targeted at detecting belt slip in a drive arrangement 200, 830 which comprises pulleys 210, 220, 840, 850 and at least one drive belt 230, 860 arranged to connect a motor axle 125, 870 to one or more tool axles 135, 880 of the construction equipment 100, 800.

The method comprises obtaining, i.e., determining, estimating or predicting S1 an expected amount of effort required to accelerate the motor axle 125, 870 from a first velocity $\omega_0$ to a second velocity $\omega_1$, measuring S2 an actual amount of effort required to accelerate the motor axle 125 from the first velocity $\omega_0$ to the second velocity $\omega_1$, and detecting S3 belt slip in the drive arrangement 200, 830 in case the expected amount of effort exceeds the measured actual amount of effort by a margin.

FIG. 10 schematically illustrates, in terms of a number of functional units, the components of a control unit 101, 801, 1000 according to embodiments of the discussions herein. This control unit may be comprised in the machines 100, 800 or elsewhere, such as in a remote device 150, 160. Processing circuitry 1010, which may be distributed over several units, is provided using any combination of one or more of a suitable central processing unit CPU, multiprocessor, microcontroller, digital signal processor DSP, etc., capable of executing software instructions stored in a computer program product, e.g. in the form of a storage medium 1030. The processing circuitry 1010 may further be provided as at least one application specific integrated circuit ASIC, or field programmable gate array FPGA.

Particularly, the processing circuitry 1010 is configured to cause the control unit 1000 to perform a set of operations, or steps, such as the methods discussed in connection to FIG. 9 and elsewhere herein.

For example, the storage medium 1030 may store the set of operations, and the processing circuitry 1010 may be configured to retrieve the set of operations from the storage medium 1030 to cause the control unit 1000 to perform the set of operations. The set of operations may be provided as a set of executable instructions. Thus, the processing circuitry 1010 is thereby arranged to execute methods as herein disclosed. The control unit comprises processing circuitry 1010, an interface 1020 coupled to the processing circuitry 1010, and a memory 1030 coupled to the processing circuitry 1010, wherein the memory comprises machine readable computer program instructions that, when executed by the processing circuitry, causes the control unit to perform the methods discussed above in connection to FIG. 9.

The storage medium 1030 may also comprise persistent storage, which, for example, can be any single one or combination of magnetic memory, optical memory, solid state memory or even remotely mounted memory.

The control unit 1000 may further comprise an interface 1020 for communications with at least one external device. As such the interface 1020 may comprise one or more transmitters and receivers, comprising analogue and digital components and a suitable number of ports for wireline or wireless communication.

The processing circuitry 1010 controls the general operation of the control unit 1000, e.g., by sending data and control signals to the interface 1020 and the storage medium 1030, by receiving data and reports from the interface 1020, and by retrieving data and instructions from the storage medium 1030. Other components, as well as the related functionality, of the control node are omitted in order not to obscure the concepts presented herein.

FIG. 11 illustrates a computer readable medium 1110 carrying a computer program comprising program code means 1120 for performing the methods illustrated in FIG. 9, when said program product is run on a computer. The computer readable medium and the code means may together form a computer program product 1100.

The invention claimed is:

1. A control unit for construction equipment, configured to detect belt slip in a drive arrangement, the drive arrangement comprising pulleys and at least one drive belt arranged to connect a motor axle to one or more tool axles of the construction equipment,
   the control unit comprising processing circuitry configured to
   obtain an expected amount of effort required to accelerate the motor axle from a first velocity to a second velocity,
   measure an actual amount of effort required to accelerate the motor axle from the first velocity to the second velocity, and
   detect belt slip in the drive arrangement in case the expected amount of effort exceeds the measured actual amount of effort by a margin.
2. The control unit according to claim 1, wherein the first velocity is smaller than the second velocity corresponding to positive acceleration, or wherein the first velocity is larger than the second velocity corresponding to negative acceleration, and

wherein the expected amount of effort and the actual amount of effort comprises an angular impulse required to accelerate the motor axle from the first velocity to the second velocity.

3. The control unit according to claim 1, wherein the expected amount of effort or the actual amount of effort comprises:

a torque applied to the motor axle to accelerate the motor axle from the first velocity to the second velocity in a given period of time, or an acceleration of the motor axle in response to a given torque applied to the motor axle.

4. The control unit according to claim 1, wherein the processing circuitry is configured to obtain an expected acceleration of the motor axle in response to the given torque applied to the motor axle as a pre-determined reference acceleration.

5. The control unit according to claim 4, wherein the processing circuitry is configured to measure the reference acceleration during a calibration procedure, and to store the measured reference acceleration in memory.

6. The control unit according to claim 1, wherein the processing circuitry is configured to obtain data indicative of a tool inertia of a tool arranged to be driven by the drive arrangement, and to determine the expected amount of effort based on the tool inertia.

7. The control unit according to claim 6, wherein the control unit is arranged to determine the tool inertia based on a measured acceleration of the motor axle in response to a reference torque applied to the motor axle or based on a measured torque applied of the motor axle to obtain a reference acceleration of the motor axle, and wherein the reference torque is smaller than a torque applied to the motor axle for belt slip detection.

8. The control unit according to claim 6, wherein the data indicative of the tool inertia is at least partly pre-configured in memory, input to the control unit manually, read out from the tool or obtained from a remote server or a wireless device.

9. The control unit according to claim 1, arranged to measure acceleration as a difference in rotation speed of the motor axle over a time period.

10. The control unit according to claim 1, wherein the control unit is arranged to determine a rotation speed of the motor axle based on one or more characteristics of an electric current drawn over an interface to the electric motor or based on an output signal from a rotary encoder arranged in connection to the motor axle.

11. The control unit according to claim 1, wherein the control unit is arranged to:

control an electric motor of the construction equipment to generate an amount of torque applied to the motor axle, trigger a notification to a user or external device in response to detecting belt slip in the drive arrangement, modify or prevent an operation of the construction equipment in response to detecting belt slip in the drive arrangement, detect malfunction in case the expected amount of effort is lower than the measured actual amount of effort by a margin, or perform a belt slip test routine function periodically or on request by a user.

12. The control unit according to claim 11, wherein the notification involves any of: a message on a display, a buzzer signal, a light signal, a message transmitted via radio to the external device, or

wherein the malfunction comprises a discrepancy between assumed and actual tool dimension or tool type.

13. Construction equipment or work appliance comprising the control unit according to claim 1.

14. A method performed in a control unit for construction equipment, for detecting belt slip in a drive arrangement, the drive arrangement comprising pulleys and at least one drive belt arranged to connect a motor axle to one or more tool axles of the construction equipment, the method comprising:

obtaining an expected amount of effort required to accelerate the motor axle from a first velocity to a second velocity, measuring an actual amount of effort required to accelerate the motor axle from the first velocity to the second velocity, and detecting belt slip in the drive arrangement in case the expected amount of effort exceeds the measured actual amount of effort by a margin.

15. Construction equipment comprising a drive arrangement with pulleys and a drive belt arranged to connect a motor axle of the construction equipment to a tool axle of the construction equipment, the construction equipment further comprising a control unit arranged to detect belt slip by the drive belt based on a difference between an expected amount of effort required to accelerate the motor axle from a first velocity to a second velocity and an actual amount of effort required to accelerate the motor axle from the first velocity to the second velocity.

16. The construction equipment according to claim 15, wherein the construction equipment is driven by an electric motor.

17. The construction equipment according to claim 15, wherein the construction equipment is driven by a combustion engine and comprises at least one rotary encoder arranged to determine an axle speed of the motor axle.

18. The construction equipment according to claim 15, wherein the control unit of the construction equipment is arranged to perform a first calibration routine, in which calibration routine data indicative of a tool inertia of a tool arranged to be driven by an electric motor or combustion engine is determined and stored in a memory of the construction equipment, wherein the control unit is arranged to determine the expected amount of effort based at least in part on the tool inertia of the tool.

19. The construction equipment according to claim 15, wherein the control unit of the construction equipment is arranged to perform a calibration routine, in which calibration routine data indicative of a reference amount of acceleration achieved for a tool with a given tool inertia and an applied torque is determined and stored in a memory of the construction equipment, wherein the control unit is arranged to determine the expected amount of effort based at least in part on the reference amount of acceleration.

20. The construction equipment according to claim 15, wherein the control unit of the construction equipment is arranged to perform a calibration routine, in which calibration routine data indicative of a reference amount of torque required to achieve a given acceleration of a tool having a given tool inertia is determined and stored in a memory of the construction equipment, wherein the control unit is arranged to determine the expected amount of effort based at least in part on the reference amount of torque.

21. The construction equipment-according to claim 15, wherein the control unit of the construction equipment is arranged to perform a belt slip evaluation routine, in which a belt slip condition of the drive arrangement is evaluated, wherein the construction equipment is arranged to trigger an action in case belt slip is detected during the belt slip evaluation routine.

22. The construction equipment according to claim 15, constituted by a power cutter, a floor grinder, a power trowel, a floor saw, a compactor or a drive module comprising a battery compartment an electric motor and the control unit.

\* \* \* \* \*